United States Patent [19]
Wilson

[11] Patent Number: 5,641,586
[45] Date of Patent: Jun. 24, 1997

[54] FUEL CELL WITH INTERDIGITATED POROUS FLOW-FIELD

[75] Inventor: Mahlon S. Wilson, Los Alamos, N. Mex.

[73] Assignee: The Regents of the University of California Office of Technology Transfer, Alameda, Calif.

[21] Appl. No.: 568,088

[22] Filed: Dec. 6, 1995

[51] Int. Cl.$^6$ ................................................ H01M 8/10
[52] U.S. Cl. ............................ 429/30; 429/34; 429/44
[58] Field of Search .................... 429/30, 34, 38, 429/44

[56] References Cited

U.S. PATENT DOCUMENTS

| | | | |
|---|---|---|---|
| 4,129,685 | 12/1978 | Damiano | 429/38 |
| 4,344,832 | 8/1982 | Dahlberg | 204/258 |
| 4,769,297 | 9/1988 | Reiser et al. | 429/17 |
| 5,108,849 | 4/1992 | Watkins et al. | 429/30 |
| 5,211,984 | 5/1993 | Wilson | 429/42 X |
| 5,234,776 | 8/1993 | Koseki | 429/30 |
| 5,234,777 | 8/1993 | Wilson | 429/33 |
| 5,252,410 | 10/1993 | Wilkinson et al. | 429/33 |
| 5,264,299 | 11/1993 | Krasij et al. | 429/30 |
| 5,300,370 | 4/1994 | Washington et al. | 429/38 X |
| 5,316,871 | 5/1994 | Swathirajan et al. | 429/44 X |
| 5,472,799 | 12/1995 | Watanabe | 429/30 |

OTHER PUBLICATIONS

Mahlon S. Wilson et al., "Alternative Flow–Field and Backing Concepts for Polymer Electrolyte Fuel Cells," Electrochemical Society Proceedings, vol. 95–23, p. 115 (1995). month n/a.

*Primary Examiner*—Stephen Kalafut
*Attorney, Agent, or Firm*—Ray G. Wilson

[57] ABSTRACT

A polymer electrolyte membrane (PEM) fuel cell is formed with an improved system for distributing gaseous reactants to the membrane surface. A PEM fuel cell has an ionic transport membrane with opposed catalytic surfaces formed thereon and separates gaseous reactants that undergo reactions at the catalytic surfaces of the membrane. The fuel cell may also include a thin gas diffusion layer having first and second sides with a first side contacting at least one of the catalytic surfaces. A macroporous flow-field with interdigitated inlet and outlet reactant channels contacts the second side of the thin gas diffusion layer for distributing one of the gaseous reactants over the thin gas diffusion layer for transport to an adjacent one of the catalytic surfaces of the membrane. The porous flow field may be formed from a hydrophilic material and provides uniform support across the backside of the electrode assembly to facilitate the use of thin backing layers.

7 Claims, 7 Drawing Sheets

FUEL CELL WITH INTERDIGITATED POROUS FLOW-FIELD

This invention relates to fuel cells and, more particularly, to polymer electrolyte fuel cells. This invention was made with government support under Contract No. W-7405-ENG-36 awarded by the U.S. Department of Energy. The government has certain rights in the invention.

BACKGROUND OF THE INVENTION

Fuel cells are highly efficient devices for electric power production. There are several families of fuel cells, classified on the basis of the electrolyte material that supports ionic transport between the electrodes: phosphoric acid, alkaline, molten carbonate, solid oxide, and polymer electrolyte membrane (PEM). Of these, the PEM is the most promising for transportation applications, but there is a requirement that the electrolyte be maintained at a relatively high hydration state for optimal performance. Since the cells must operate at a temperature where the water vapor pressure is below the system pressure so that the electrolyte does not dry out, two-phase flow of both liquid and gas in the flow-fields is inevitable.

Current flow-field technology for phosphoric acid, alkaline and PEM fuel cells typically consists of grooved, serpentine, flow-fields through which the reactants flow (see, e.g., U.S. Pat. No. 5,108,849). An alternative flow-field is described in U.S. Pat. No. 4,769,297, where the flow-fields are formed from porous ribbed plates and the flow channels form a waffle-like structure and there is no separation of inlet and outlet channels. In order to bridge the open faced channels of the flow-field, a relatively rigid structure is required to facilitate the transition from the flow-channel to the catalyst layer adjacent the membrane that catalyzes the chemical reactions producing an electron current. This structure is the gas diffusion layer, or backing, and typically consists of a carbon cloth or paper onto which a mixture of carbon black and PTFE is cast and compressed.

In an electrode that supplies air as a reactant, oxygen must diffuse through the backing in order to reach the catalyst layer. This diffusional barrier lowers the effective concentration of oxygen at the catalyst layer with concomitant reduction in fuel cell performance. U.S. Pat. No. 4,129,685 to Damiano teaches the use of porous flow-fields in place of ribbed flow-fields in phosphoric acid fuel cells. Relatively thick layers of fibrous carbon paper or bonded particles are incorporated into the design of the gas-diffusion style electrodes conventionally used in phosphoric acid fuel cells. In this case, the carbon paper component is actually the flow-field because the reactants are forced to flow laterally through this component.

One of the difficulties with existing porous flow-field technology is the inherently high pressure drop that is generated when appreciable amounts of gas are forced through large electrode area porous flow-fields. A conventional solution is to use thick porous flow-fields. But the use of thicker flow-fields results in thicker unit cells, i.e., lower power densities. Further, the gas flows may tend to channel, especially in the case of PEM fuel cells, where water may accumulate and block off active regions. Finally, the high current density region is along the edge where the fresh reactant stream enters the cell, resulting in uneven heating of the cell and corresponding problems in cooling the cell.

These problems are addressed by the present invention. Accordingly, it is an object of the present invention to provide a porous flow field with reduced pressure drop through the flow field.

It is another object of the present invention to minimize water accumulation within the flow field.

One other object of the present invention is to maximize access of reactants to the catalyst layers.

Yet another object of the present invention is to provide for the use of very thin backings to minimize the gas diffusional barrier.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a PEM fuel cell having an ionic transport membrane with opposed catalytic surfaces formed thereon and separating gaseous reactants that undergo reactions at the catalytic surfaces of the membrane. The fuel cell further includes a thin gas diffusion layer having first and second sides with a first side contacting at least one of the catalytic surfaces. A macroporous flow-field contacts the second side of the thin gas diffusion layer for distributing one of the gaseous reactants over the thin gas diffusion layer for transport to an adjacent one of the catalytic surfaces of the membrane. In preferred embodiments of the invention, the porous flow field is formed from a hydrophilic material and provides uniform support across the backside of the electrode assembly to facilitate the use of thin backing layers.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
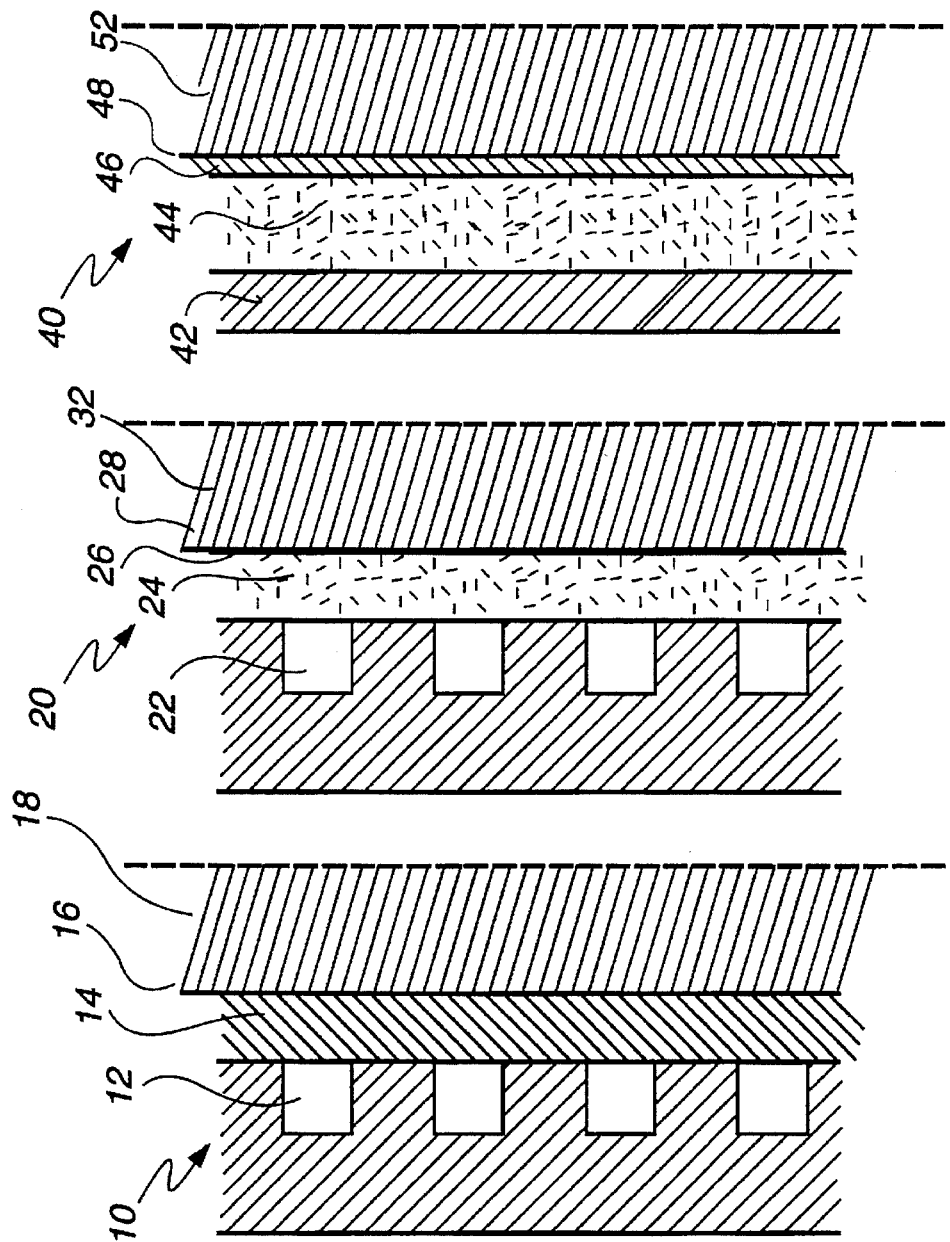
FIG. 1A is a cross-sectional representation of a polymer electrolyte membrane (PEM) fuel cell according to the prior art.
FIG. 1B is a cross-sectional representation of a PEM fuel cell according to one embodiment of the present invention.
FIG. 1C is a cross-sectional representation of a PEM fuel cell according to a second embodiment of the present invention.

Current flow-field technology for polymer electrolyte membrane (PEM) fuel cells typically consists of grooved, serpentine flow-fields through which the gaseous reactants flow, such as shown in U.S. Pat. No. 5,108,849. A cross-section schematic of such a prior art fuel cell 10 is shown in FIG. 1A. A flow field plate defines serpentine channels 12 above gas diffusion backing 14. In order to bridge open faced channels 12, a relatively rigid structure is required for gas diffusion backing 14 to facilitate the transition from flow-channels 12 to catalyst layer 16, while ensuring gas transport is uninhibited by excessive liquid water. Gaseous reactants must diffuse through gas diffusion backing 14 to reach catalyst layer 16 on PEM 18. It will be appreciated that the effect of diffusion backing 14 acts to reduce the amount of reactant reaching catalyst layer 16, with a concomitant effect on performance at increased current densities in fuel cell 10. If the ribbed material forming flow-channels 12 is a solid material, then reactants must also diffuse laterally through the backing to reach catalyst layer 16 in the regions centered under a rib.

In accordance with the present invention and as shown in FIGS. 1B and 1C, a fuel cell 20, 40 is provided with a macroporous flow field 24, 44 to support reduced thickness gas diffusion backings 26, 46. As used herein, macroporous means pore sizes appreciably larger than 1 μm, e.g. 20–100 μm. A high porosity (>60%) is also inferred As more particularly described below, diffusion backings 26, 46 are much thinner than diffusion backing 14 shown in FIG. 1A, e.g., 30 μm rather than 300 μm, to increase reactant gas availability at catalytic layer 28, 48 on PEM 32, 52. In a preferred configuration, the gas diffusion backings primarily contain a fine, microporous (<1 μm pore diameter) component that is hydrophobic, highly porous, and with minimal tortuosity (e.g., Carmen tortuosity factor that relates the tortuous gas path length to the backing thickness). In FIG. 1B, a flow-field plate defines reactant flow channels 22, which may be a conventional serpentine path, other channel-based flow-field, or interdigitated according to the present invention. Flow-channel 22 is provided adjacent macroporous layer 24, where layer 24 supports thin gas diffusion backing 28 above catalyst layer 28 on polymer membrane 32. In FIG. 1C, reactant flow is directly introduced into macroporous flow-field 44 located between separator plate 42 and thin gas diffusion backing 46. Again, backing 46 contacts catalyst layer 48 on PEM 52.

It should be noted that FIGS. 1A, 1B, and 1C depict only one electrode of a PEM fuel cell and a complete fuel cell is generally symmetric about the membrane centerline. Thus, each membrane separates the anode and cathode reactants and has opposed catalytic surfaces on opposite side of the membrane.

Figure 2:
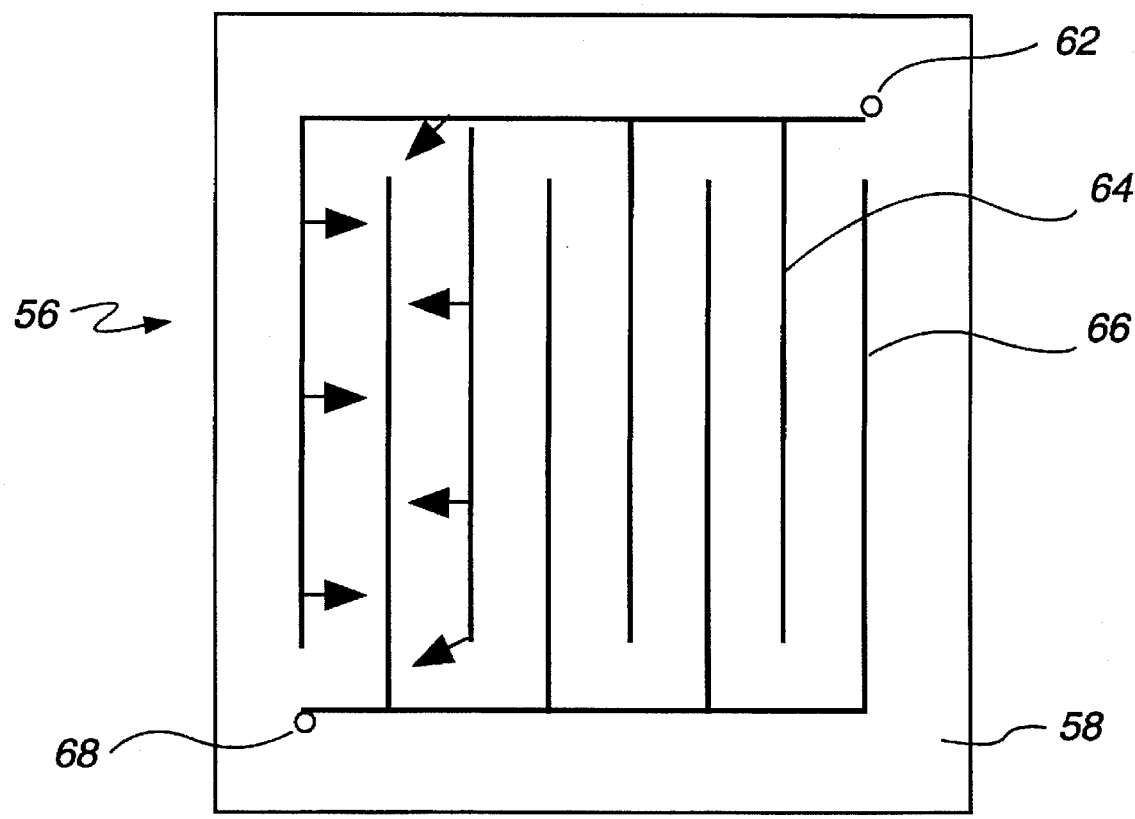
FIG. 2 is an isometric illustration of a flow field having interdigitated flow channels in accordance with the present invention.

FIG. 2 depicts a particular aspect of the present invention for reducing pressure drops along a macroporous flow plate 56. A reactant flow-field is then formed of a flow-field plate 58 that further defines interdigitated flow channels. As shown, a reactant gas is introduced through reactant inlet 62 and flows through reactant inlet channels 64. A reactant then traverses a macroporous material and exits through reactant outlet channels 66 to reactant outlet 68. Inlet channels 64 and outlet channels 66 are interdigitated to minimize the traverse paths of reactant through the adjacent macroporous material so that the reactant is distributed relatively uniformly to the surface of an underlying gas diffusion backing. In one embodiment, interdigitated channels are formed in a separate reactant distribution channels, e.g., flow-field plate 22 shown in FIG. 1B. In a second embodiment, interdigitated channels are formed in the macroporous layer, e.g., flow-field 44 shown in FIG. 1C.

As discussed herein, catalyst layers 28, 48 and membranes 32, 52 are "thin-film" catalyzed membranes as described in U.S. Pat. Nos. 5,211,984 and 5,234,777, incorporated herein by reference. Typically, these are low platinum loadings (0.12 to 0.18 mg Pt/cm$^2$ or less at the anode) with 5–7 82 m thick catalyst layers formed by the application of a catalyst/ionomer solution "ink" to the membrane. Catalysts are 20 wt % Pt on Vulcan XC-72 from E-tek (Natick, Mass.). With these catalyst layers, the gas diffusion backing materials used are microporous, hydrophobic, electronically conducting structures similar to "gas-diffusion" electrodes except that they are not catalyzed. Other commercial gas diffusion-type structures are based on carbon paper instead of carbon cloth, but carbon cloth is preferred.

Figure 3:
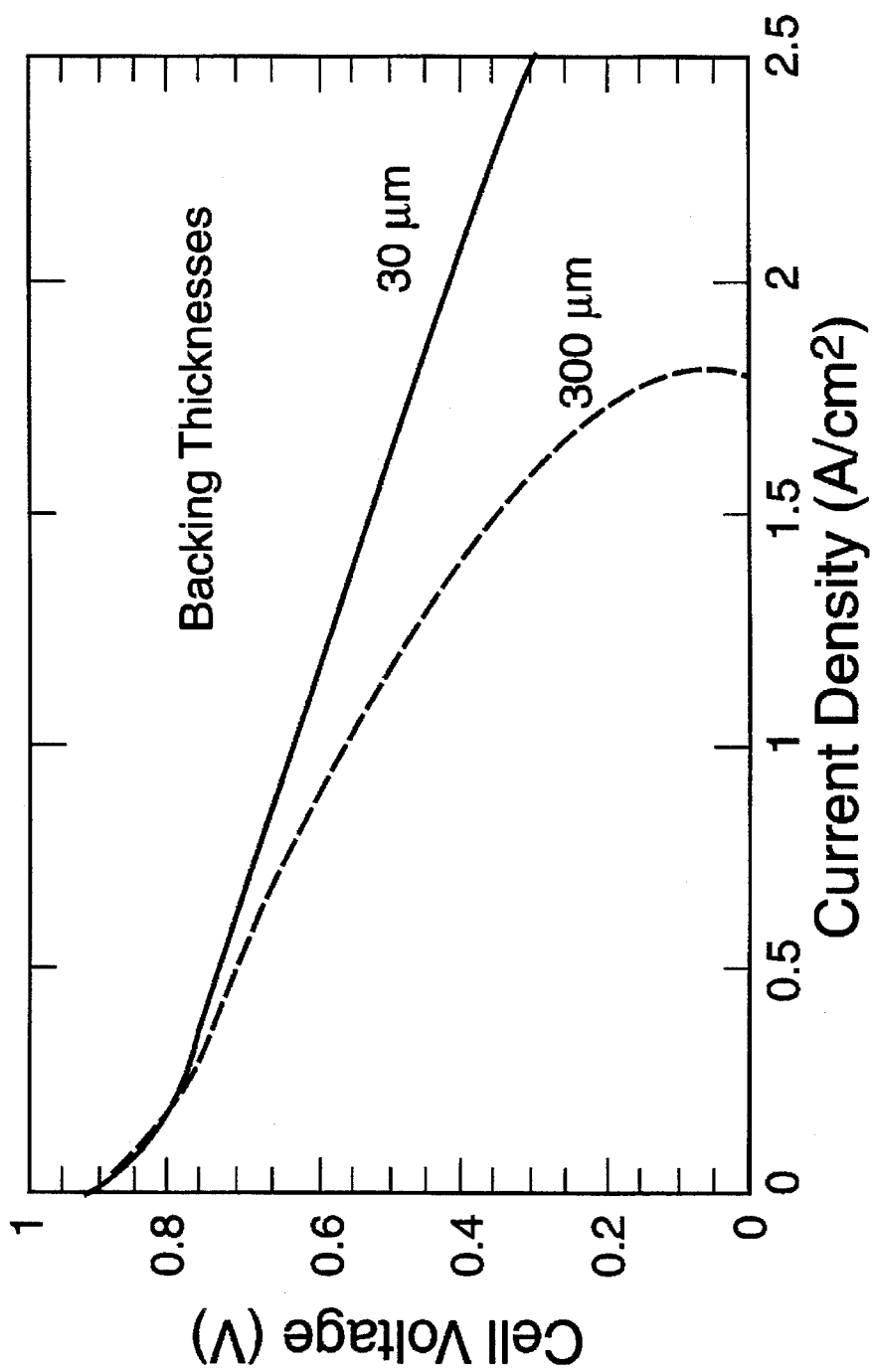
FIG. 3 graphically depicts a performance comparison between a PEM fuel cell having a backing with a thickness of 300 μm and a PEM fuel cell having a backing with a thickness of 30 μm.

In one aspect of the present invention shown in FIGS. 1B and 1C, the use of a macroporous flow-field plate permits a relatively thin gas diffusion backing to be used for reduced reactant diffusion losses under high current conditions. FIG. 3 graphically depicts the simulated performance of two fuel cells: one having a diffusion backing 300 μm thick and one having a diffusion backing 30 μm thick. The mass transport limitations are significantly less with the thinner backing, with resulting higher limiting current densities. Even in the maximum power region (about 0.5 V), significant improvement is evident.

In the configuration shown in FIG. 1B, a macroporous layer 24 is combined with a thin gas diffusion layer 26 to reduce the effects of a thick gas diffusion layer 14 (FIG. 1A). The macroporous layer 24 provides structural backing to diffusion layer 26 but does increase the diffusion barrier effect. But a 300 μm thick macroporous layer effectively presents a gas transport barrier similar to that of a 40 μm thick microporous structure.

Figure 4:
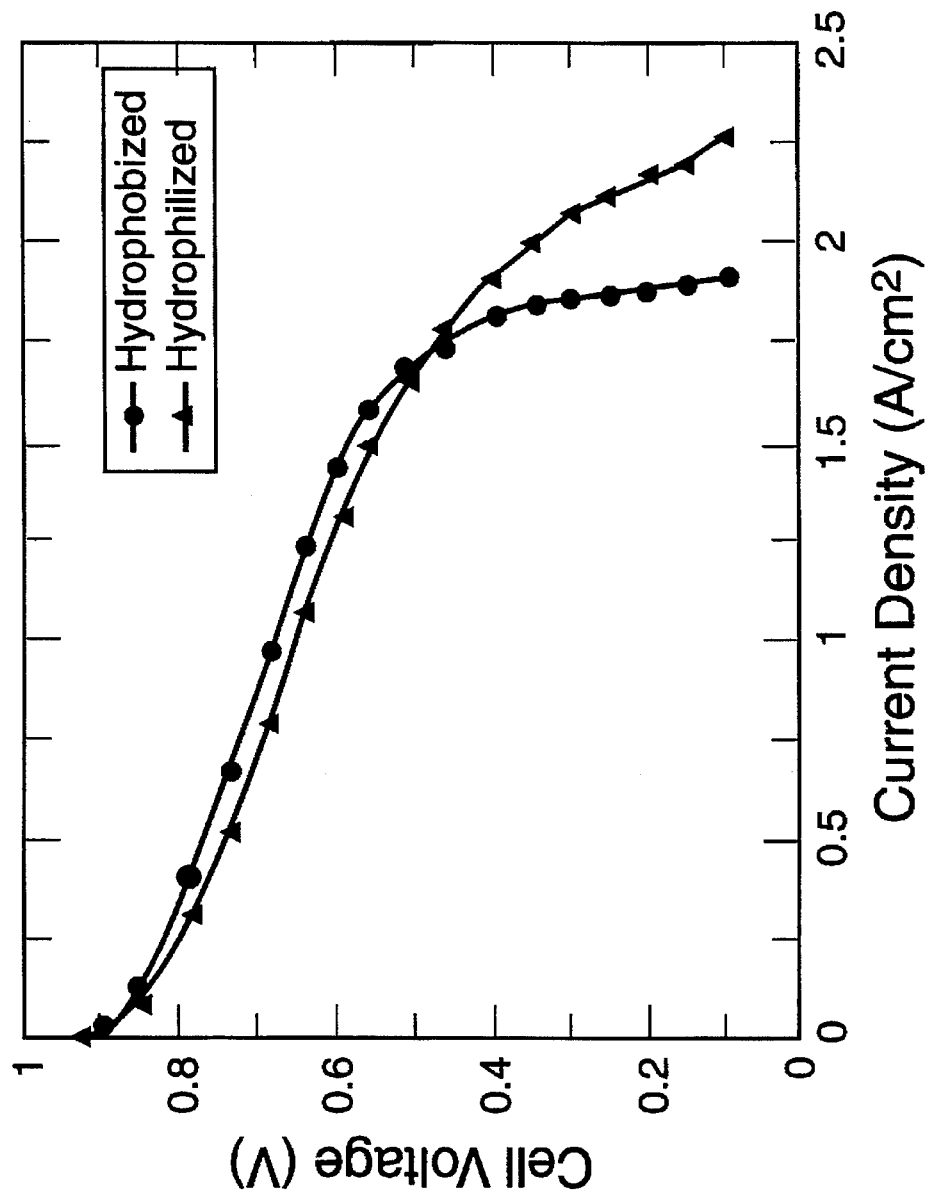
FIG. 4 graphically depicts polarization curves comparing PEM fuel cells with backing layers that are hydrophobic and hydrophilic.

It should be noted that water that has passed through the hydrophobic backing layer may tend to accumulate at the interface in the larger pores of the macroporous layer. Accordingly, it is another aspect of the present invention to form the macroporous layer from a hydrophilic material. FIG. 4 graphically depicts the performance of two fuel cells using conventional serpentine flow-fields: one with a hydrophobic macroporous layer and one with a hydrophilic macroporous layer. In both cases, the bilayer consists of a thin microporous layer, discussed above, with a macroporous layer of 250 μm thick Spectracarb 2050 (Spectracorp, Lawrence, Mass.) carbon paper. In one case, the carbon paper was hydrophobized with FEP 120 (DuPont) and, in the other case, the carbon paper was hydrophilized with 2% diluted Nafion™ (5% solution from Solution Technology, Mendenhall, Pa.). At higher current densities, the limiting current density of the cell with the hydrophilic backing support is somewhat greater than that of the hydrophobic support, whose rapid voltage decay suggests a "flooding" condition, which may result from water trapping at the bilayer interface.

Referring again to FIG. 1C, the bilayer components 44, 46 serve as the flow-field where reactants are caused to flow laterally along this component. U.S. Pat. No. 4,129,685 to Damiano teaches the use of a thick layer of carbon foam to serve as a porous flow-field in a phosphoric acid fuel cell and, in one embodiment, in contact with a layer having relatively smaller pore sizes to prevent penetration of the catalyst into the pores. But there is no teaching about combining such a flow-field with a gas diffusion barrier or about the effects of water accumulation on the macroporous flow-field. The structures described herein typically form the macroporous flow-field from resin bonded carbon paper available, e.g., from Toray (Japan) or Spectracorp. This material is about 70% porosity, 30 μm mean pore diameter, of various thicknesses. Other possible porous structures include carbon or metal foams, sintered particles, and woven or non-woven metal screens.

Macroporous flow-fields can have relatively high pressure drops when appreciable amounts of reactant gas are forced through relatively thin and long porous flow-fields with pores only about 30 μm in diameter. One solution is to use thick porous flow-fields, but this introduces some performance penalties. First, the use of thicker flow-fields results in thicker unit cells with resulting lower stack power densities. Further, the gas flows more readily channel, especially in the case of PEM fuel cells where water may accumulate and block off regions within the flow-field. Finally, the high current density is concentrated along edge regions of the flow-field where the reactant stream enters the cell. Since the majority of heat is generated in these regions, cooling a stack becomes more difficult and the high current density regions tend to flood with generated water.

Figure 5:
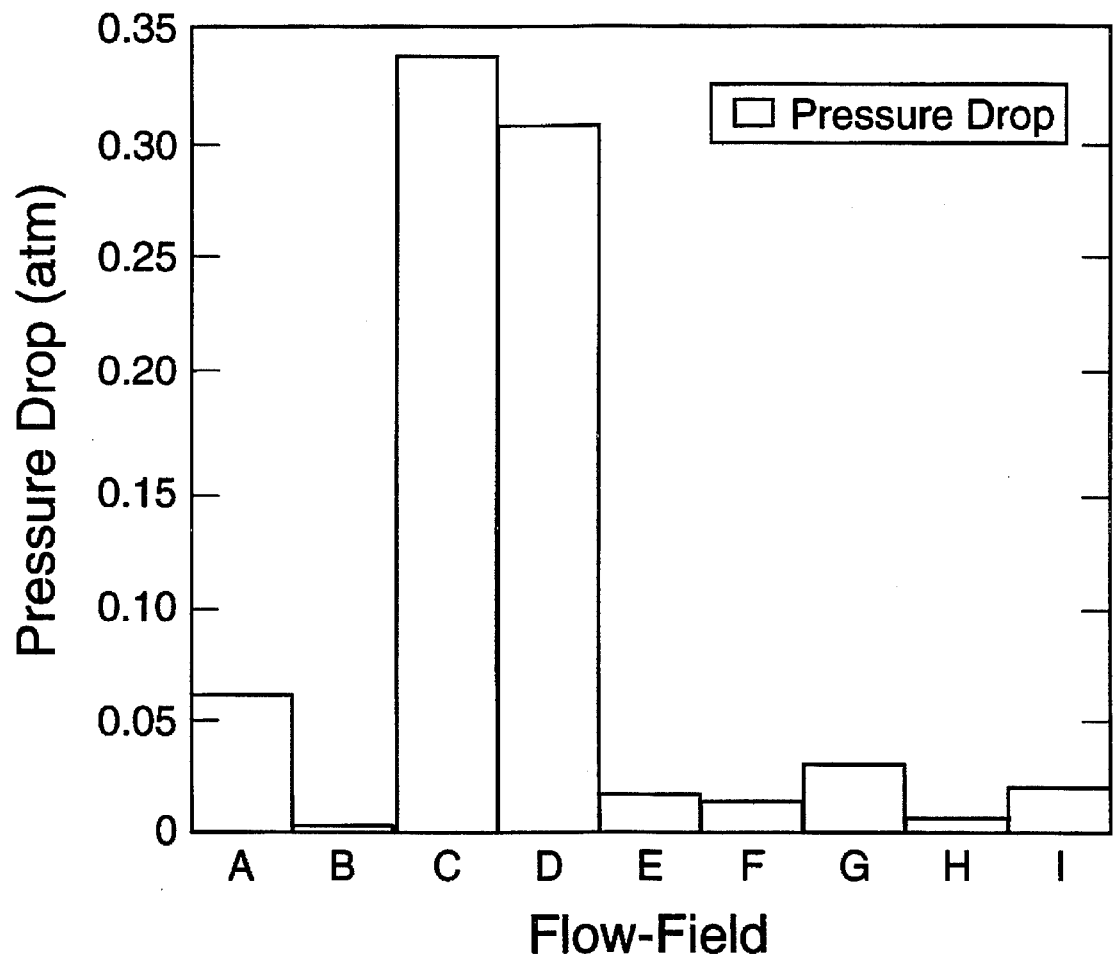
FIG. 5 graphically compares flow field pressure drop with two different flow field thicknesses.

As discussed above, another embodiment of fuel cell with macroporous flow-fields uses the interdigitated channels in the flow-field shown in FIG. 2. FIG. 5 graphically depicts pressure drops over 50 cm$^2$ macroporous flow-fields with no channels (NC) and with interdigitated (ID) channels. FIG. 5 also shows the effects of flow-field thickness (t=macroporous material thickness), spacing between channels, i.e., rib width (w=rib width), and hydrophilicity (PANI denotes the application of polyaniline for hydrophilicity) as specified in Table A. The fuel cell used to obtain the data depicted in FIG. 5 was formed with inter-digitated channels formed in a reactant distribution plate adjacent the macroporous flow-field, which was 0.25 mm thick. The channels could also be formed directly in a thicker macroporous flow-field plate, as discussed above.

macroporous flow-field having no channels. This may be an anomalous result where no channeling occurred in the non-coated case so that the hydrophilic flow-field may have increased water uptake with a resulting decrease in pore diameter and concomitant increase in pressure drop.

Figure 6:
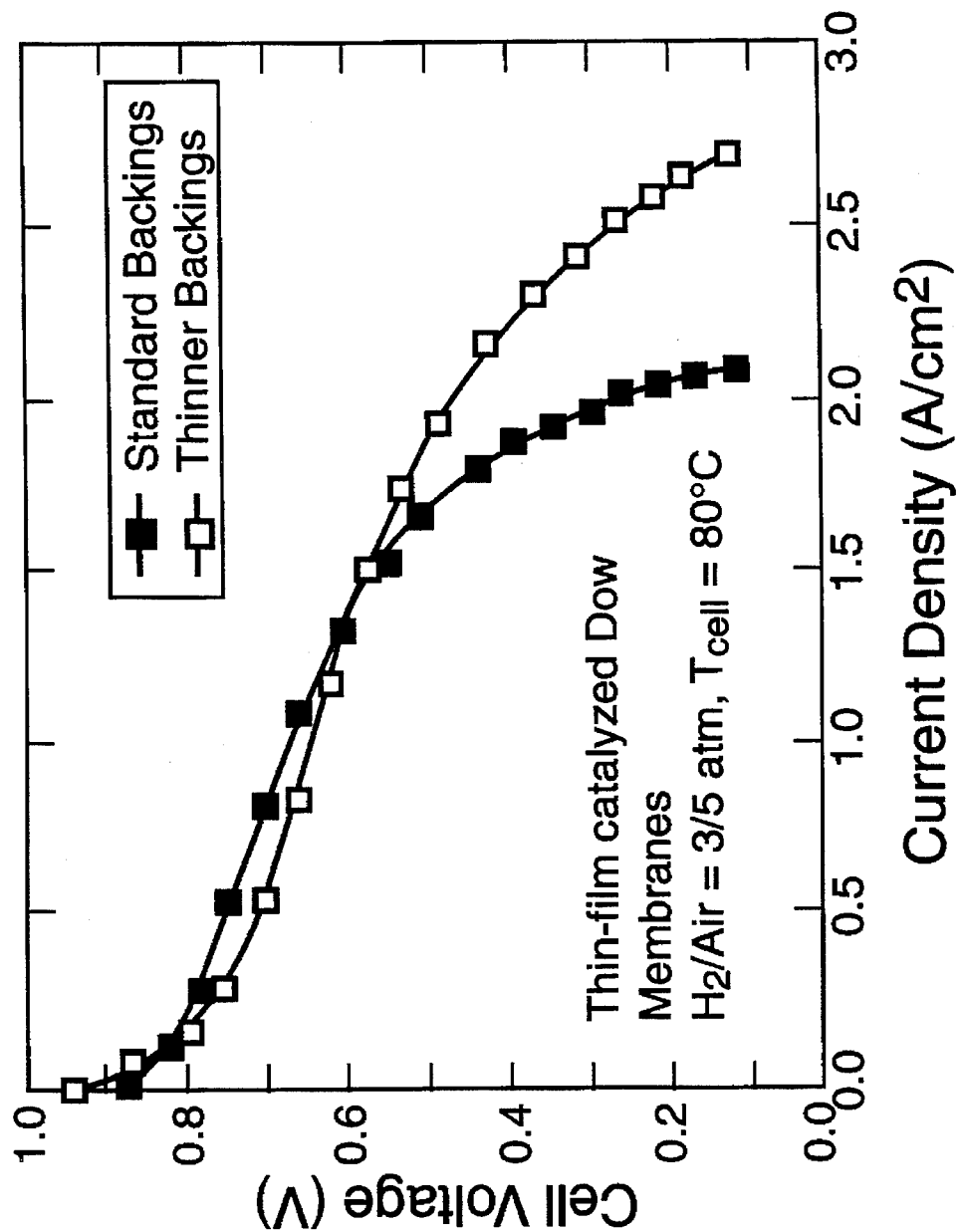
FIG. 6 graphically depicts the current density performance of PEM fuel cells with two different backing thicknesses.
Figure 7:
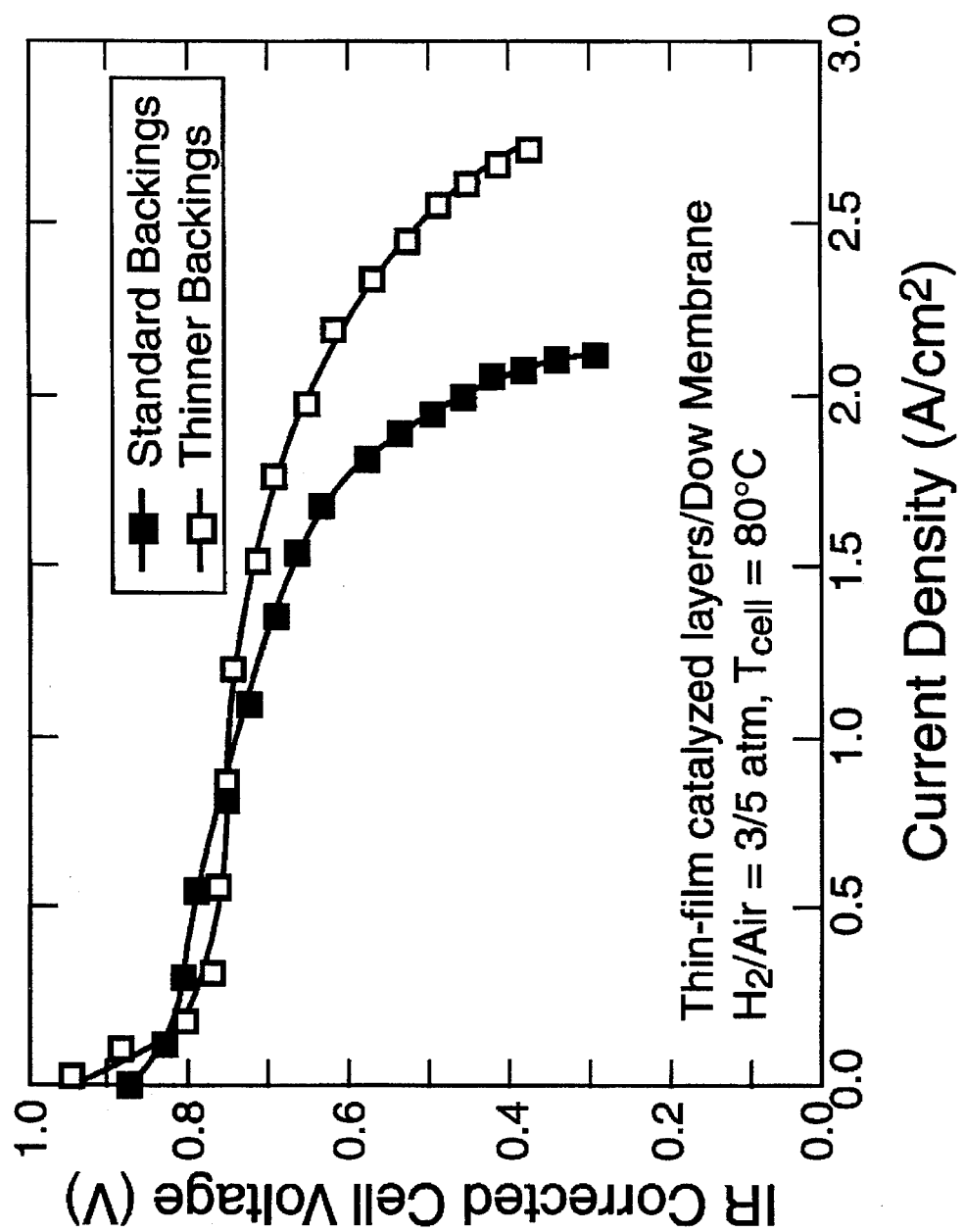
FIG. 7 graphically shows the data shown in FIG. 6 with the voltage corrected for internal resistance (R).

An experimental fuel cell of 10 cm$^2$ was constructed with a 0.25 mm thick hydrophilic porous flow-field overlying interdigitated channels and a 25 μm thick hydrophobic gas diffusion backing with a thin-film catalyzed developmental Dow membrane. FIG. 6 graphically depicts a comparison of the performance of this cell with a conventional 5 cm$^2$ cell with a standard gas diffusion backing about 300 μm thick and serpentine flow-fields. All other conditions were similar. As shown in FIG. 7, the limiting current density with the thinner backing is substantially greater.

FIG. 7 graphically depicts the data shown in FIG. 6 corrected for cell iR (internal resistance R) losses. It is seen that that the low current density performance of the two cells are about equal, but the limiting current advantage of the cell with the thinner backing is clearly seen.

Thus, the present invention recognizes that the development of catalyzed membranes for PEM fuel cells acts to separate the function of catalyst layer and gas diffusion backing and permits the use of relatively thin gas diffusion backings in combination with the catalyzed membranes. The very thin backings permit increased reactant transport in air electrodes with a resulting higher performance, as shown above by the substantially higher limiting current densities. When thin backings are used in a bilayer configuration in combination with a more open, structural component, a performance equivalent to that of conventional thick backings are attained with materials that are machine made and very inexpensive compared to conventional gas-diffusion type backings.

The performance of fuel cells with thin backings should be further improved when used with macroporous flow-field structures so as to minimize the diffusion barrier. While porous flow-fields provide uniform support and reactant access across the backing, the use of such materials often results in undesirable high pressure drops. The use of interdigitated channels in conjunction with the porous flow-field provides a lower pressure drop and further improves

TABLE A

| FLOW FIELD | NO CHANNELS (NC) | INTER-DIGITATED (ID) | MACRO-POROUS LAYER THICKNESS (mm) | RIB WIDTH (mm) | HYDRO-PHILICITY (PANI) |
|---|---|---|---|---|---|
| A | X | | 1.5 | | NO |
| B | | X | 1.5 | 5 | NO |
| C | X | | 0.25 | | NO |
| D | X | | 0.25 | | YES |
| E | | X | 0.25 | 10 | NO |
| F | | X | 0.25 | 5 | NO |
| G | | X | 0.25 | 5 | YES |
| H | | X | 0.25 | 3 | NO |
| I | | X | 0.25 | 3 | YES |

FIG. 5 clearly indicates that the use of interdigitated flow channels reduces pressure drops by at least an order of magnitude. Decreasing the rib thickness "w" from 10 mm to 3 mm further lowered the pressure drop by about a factor of 2. The use of hydrophilic material for the macroporous flow-field acted to generally reduce the pressure drop, but an increase in pressure drop did occur in the case of a reactant distribution across the diffusion layer. The interdigitated channels may be formed in the macroporous material to further simplify cell construction. It will be appreciated that the macroporous flow-field structures according to the present invention can be used also without any type of gas diffusion layer or backing, e.g., with wet-proofed catalyst layer electrodes. Performance of cells with standard, relatively thick gas diffusion backings would also be improved.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A polymer electrolyte membrane (PEM) fuel cell having an ionic transport membrane with opposed surfaces formed thereon separating gaseous reactants producing reactions at catalytic surfaces of said membrane, said fuel cell comprising:

a gas diffusion layer having first and second sides with a first side contacting at least one of said catalytic surfaces;

a macroporous flow-field layer contacting said second side of said gas diffusion layer for distributing ones of said gaseous reactants over said gas diffusion layer for transport to an adjacent one of said catalytic surfaces of said membrane; and a reactant distribution plate defining interdigitated flow channels and contacting said macroporous flow-field layer for delivering reactant to and removing reactant from said macroporous flow-field layer.

2. A polymer electrolyte membrane (PEM) fuel cell having an ionic transport membrane with opposed surfaces formed thereon separating gaseous reactants producing reactions at catalytic surfaces of said membrane, said fuel cell comprising:

a gas diffusion layer having first and second sides with a first side contacting at least one of said catalytic surfaces; and a macroporous flow-field layer contacting said second side of said gas diffusion layer for distributing ones of said gaseous reactants over said gas diffusion layer for transport to an adjacent one of said catalytic surfaces of said membrane, wherein said macroporous flow-field layer defines interdigitated flow channels for delivering reactant to and removing reactant from above said gas diffusion layer.

3. A fuel cell according to claim 2, wherein said macroporous flow-field is hydrophilic and said gas diffusion layer is hydrophobic.

4. A fuel cell according to claim 1, wherein said macroporous flow-field is hydrophilic and said gas diffusion layer is hydrophobic.

5. An improved flow-field layer for used in distributing a gaseous reactant for delivery to a catalytic surface of a PEM fuel cell, where the improved layer is a macroporous material including ribs that define inlet channels for introducing said gaseous reactant and outlet channels for removing reaction products, where said gaseous reactant moves from said inlet channels toward said outlet channels through said ribs.

6. An improved flow-field layer according to claim 5, wherein said inlet channels and said outlet channels are interdigitated.

7. An improved flow-field layer according to claim 5, wherein said macroporous material is hydrophilic.

* * * * *